United States Patent [19]

Kajino et al.

[11] 4,388,658

[45] Jun. 14, 1983

[54] MAGNETIC TAPE RECORDING AND/OR REPRODUCING APPARATUS

[75] Inventors: Jirou Kajino; Hitoshi Minabe, both of Neyagawa; Shigeki Murata, Nara, all of Japan

[73] Assignee: Matsushita Electric Industrial Co., Ltd., Osaka, Japan

[21] Appl. No.: 203,889

[22] Filed: Nov. 4, 1980

[30] Foreign Application Priority Data

Nov. 8, 1979 [JP] Japan ............................ 54-144973

[51] Int. Cl.³ ..................... G11B 5/08; G11B 15/00
[52] U.S. Cl. .................................... 360/85; 360/95
[58] Field of Search ................ 360/85, 84, 95, 93, 360/130.22, 130.23, 132

[56] References Cited

U.S. PATENT DOCUMENTS

| | | | |
|---|---|---|---|
| 4,012,788 | 3/1977 | Blanding | 360/85 |
| 4,045,820 | 8/1977 | Staar | 360/85 |
| 4,126,888 | 11/1978 | Hayashi et al. | 360/95 X |
| 4,309,731 | 1/1982 | Yoshida et al. | 360/85 |

*Primary Examiner*—John H. Wolff
*Attorney, Agent, or Firm*—Wenderoth, Lind & Ponack

[57] ABSTRACT

A magnetic tape recording and/or reproducing apparatus wherein a magnetic tape is drawn out of a tape cartridge by a tape drawing mechanism which is driven from its inoperative position to its operative position by a motor rotating in one rotational direction only; and the tape is wound up onto one of the reels of the tape cartridge by a turntable rotating mechanism which automatically engages one of the turntables so as to rotate in accordance with the rotation of the motor in the opposite direction.

4 Claims, 6 Drawing Figures

MAGNETIC TAPE RECORDING AND/OR REPRODUCING APPARATUS

This invention relates generally to a magnetic tape recording and/or reproducing apparatus of an automatic-tape-loading and unloading type and more particularly to an apparatus wherein a magnetic tape is drawn out of a tape cartridge and placed in a specific tape path at the time the apparatus is placed in the recording/reproducing mode of operation. This tape must be restored into the tape cartridge without slackening before ejection of the tape cartridge from the apparatus.

Still more specifically, the invention relates to an automatic-tape-loading-and-unloading type recording-/reproducing apparatus having tape restoring means which has a simple structure.

A recording/reproducing apparatus of the automatic tape-loading and unloading type accomplishes recording/reproducing by drawing the magnetic tape out of a tape cartridge and wrapping it around a guide drum over a specific angular range. In this apparatus, a separate operation is required for returning the magnetic tape into the tape cartridge at the time of unloading. Usually rotational power is imparted to a take-up reel drive turntable or a supply reel drive turntable in the tape take-up direction to carry out said operation.

By the use of this means, and as unloading is carried out, the tape which has been drawn out of the tape cartridge is continuously returned into the tape cartridge.

For this reason, in addition to a mechanism for imparting rotational power to the take-up reel drive turntable in the tape take-up direction at the time of recording/reproducing operation, the techniques hithertofore employed in the commercially sold apparatus require a complicated mechanism or a relatively expensive electric element such as a plunger, for the unloading operation and for returning the tape into the tape cartridge.

Accordingly, it is a principal object of the present invention to provide an improved and useful recording-/reproducing apparatus of the automatic-tape-loading-loading-and-unloading type which overcomes the above described disadvantages.

Another object of the present invention is to provide an improved recording/reproducing apparatus wherein the magnetic tape which has been drawn out of the tape cartridge is securely drawn back into the tape cartridge in accordance with the rotation of a reel drive turntable at the time of an unloading operation.

Still another object of the present invention is to provide an improved recording/reproducing apparatus having a frictional mechanism for preventing the tape from being subject to excessive tape tension during an tape drawing-in operation.

Still another object of the present invention is to provide an improved recording/reproducing apparatus wherein an operator can change the operation mode rapidly yet with minimal force, noise, wear(on parts) from a loading mode to an unloading mode or vice versa, because the operations only depend on the rotational direction of one and the same motor.

Yet another object of the present invention is to provide an improved recording/reproducing apparatus which makes little noise when the loading mode is changed to the unloading and tape drawing-in mode.

These objects are achieved by the provision of a magnetic tape recording and/or reproducing apparatus for recording and/or reproducing signals on a magnetic tape wound on reels contained in a tape cartridge, said apparatus comprising: a reversible motor; a pair of drive turntables engagable with the reels in the tape cartridge when the cartridge is inserted in said apparatus for rotating said reels; tape loading means connected to said reversible motor for, when said reversible motor is rotated in one direction of rotation, being moved from an inoperative position to an operative position for drawing the magnetic tape out of the tape cartridge and loading the magnetic tape in a specific tape path in said apparatus, and, when said reversible motor is rotated in the other direction of rotation, being moved from the operative position to the inoperative position; and tape drawing-in means connected to and driven by said reversible motor when said reversible motor is rotated in said other direction and frictionally engaged with one of said reel drive turntables for driving said one reel drive turntable for drawing the magnetic tape back into the tape cartridge when said tape loading means is moved to the inoperative position.

Further objects and advantages of this invention will become apparent from the following detailed description considered in connection with the accompanying drawings, in which.

Figure 1:
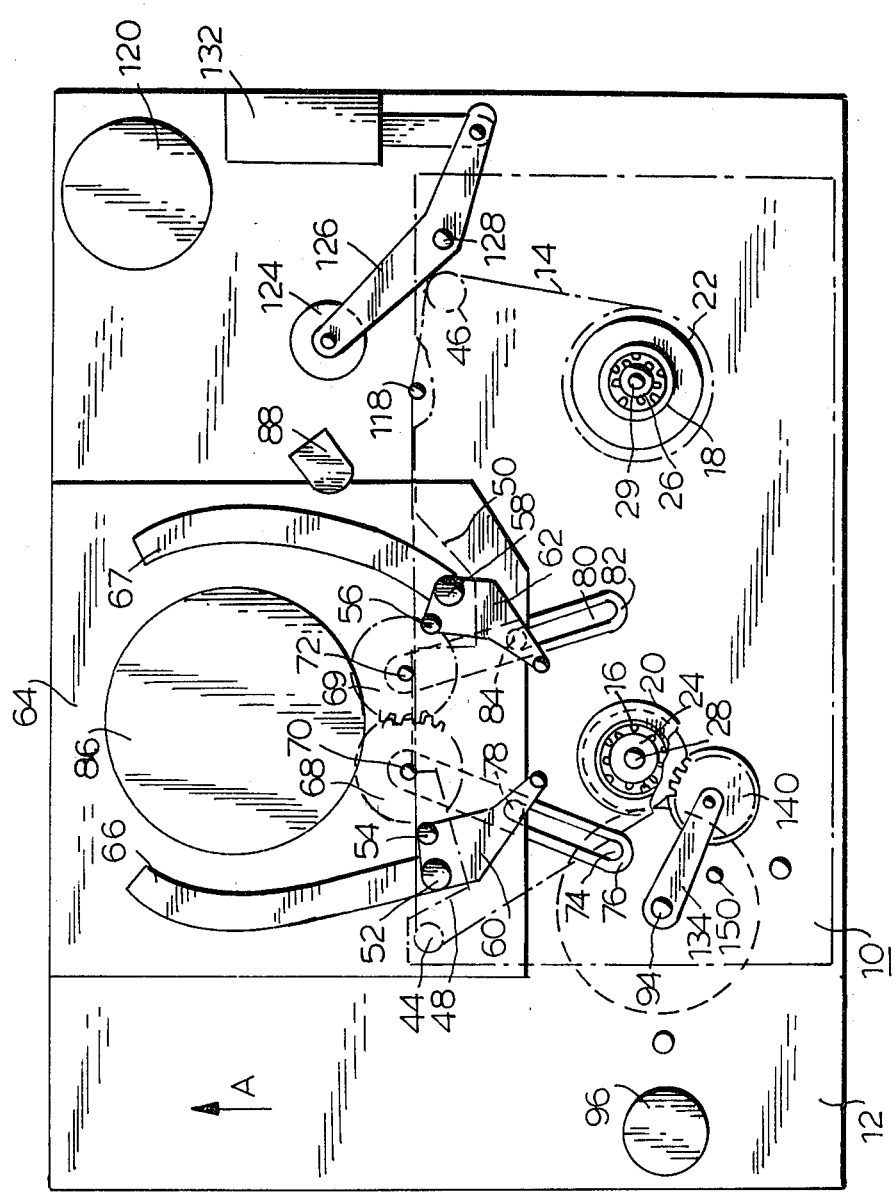
FIGS. 1 and 2 are schematic plan views of one embodiment of a tape recording and/or reproducing apparatus according to this invention, and illustrating the position of a tape cartridge, in dot-dash lines, which is positioned on the apparatus, in the tape unloaded mode and tape loaded mode.

Referring now to the drawings, the construction and the operation of the tape recording and/or reproducing apparatus according to the present invention will be explained hereinafter.

A tape cartridge 10 is set on a chassis 12 as shown in dot-dash lines in FIG. 1. The tape cartridge 10 includes a magnetic tape 14 wound on and extending between a supply reel 16 and a take-up reel 18 which are rotatably mounted in the cartridge 10. The chassis 12 has a supply mounted in the cartridge 10. A pair of reel drive turntables, that is, a supply reel drive turntable 20 and a take-up reel drive turntable 22 are rotatably mounted on spaced-apart shafts 28 and 29 fixed on chassis 12. A pair of spindles 24 and 26 are formed on the respective reel drive turntables, and the respective reels 16 and 18.

Figure 4:
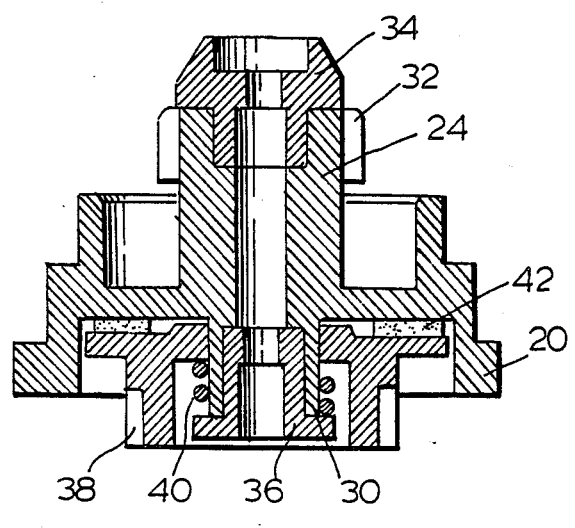
FIG. 4 is a sectional view of a reel drive turntable forming part of the apparatus taken along the line 4—4 of FIG. 2 as viewed in the direction of the arrows.

As shown in FIG. 4, the supply reel drive turntable 20 has a hub 30 at its base. The spindle 24 has several radially projecting carrier ribs 32 at its upper end which can engage radial projections in a bore of the supply reel 16 in the tape cartridge 10. The supply reel drive turntable 20 is rotatably journaled on the shaft 28 by an upper cap 34 and a lower cap 36 clamped to the shaft at the ends of the spindle 24 and the hub 30, respectively. A slip gear 38 is rotatably mounted on the hub 30 coaxially with and independently rotatable relative to the supply reel drive turntable 20, and is urged upwardly by a compression spring 40 which is positioned between the lower cap 36 and the gear 38 so as to press a felt ring 42 against an inner surface of the supply reel drive turntable 20. Through this frictional mechanism, the slip gear 38 can drive the supply reel drive turntable 20 by frictional force exerted between the supply reel drive turntable 20 and the felt ring 42 (or between the felt ring 42 and the slip gear 38).

Within the tape cartridge 10, there are further provided tape guide pins 44 and 46, whereby the magnetic tape 14 drawn out from the supply reel 16 is guided by the guide pin 44, passes by the front surface of the cartridge 10, and passing around the pin 46, reaches the take-up reel 18. The cartridge 10 is provided at its front with two recesses 48 and 50 as shown in FIG. 1.

In the inoperative condition of the apparatus, two pairs of guide pins 52, 54 and 56, 58 which are secured on a first slider 60 and a second slider 62, respectively, are within the respective recesses 48 and 50 and behind the magnetic tape. These sliders 60 and 62 are slidably mounted on a sub-chassis 64 guided along respective grooves 66, 67 by suitable guide means (not shown).

A pair of gears 68 and 69 which engage each other are rotatably mounted on the shafts 70 and 72, respectively, extending downward from the sub-chassis 64. A slot 74 formed in an arm 76 which is fixed on the gear 68 engages a pin 78 extending downward from the first slider 60. Therefore, when the gear 68 and arm 76 rotate clockwise in FIG. 1, the first slider 60 slides in the direction of arrow A along the groove 66 and guide pins 52 and 54 draw the magnetic tape 14 out of the tape cartridge 10.

Similarly slot 80 cut in an arm 82 which is fixed on the gear 69 is engaged by a pin 84 extending downward from the second slider 62 so as to draw the magnetic tape 14 out of the tape cartridge 10 by guide pins 56 and 58 in accordance with counterclockwise rotation of gear 69 and arm 82.

Figure 2:
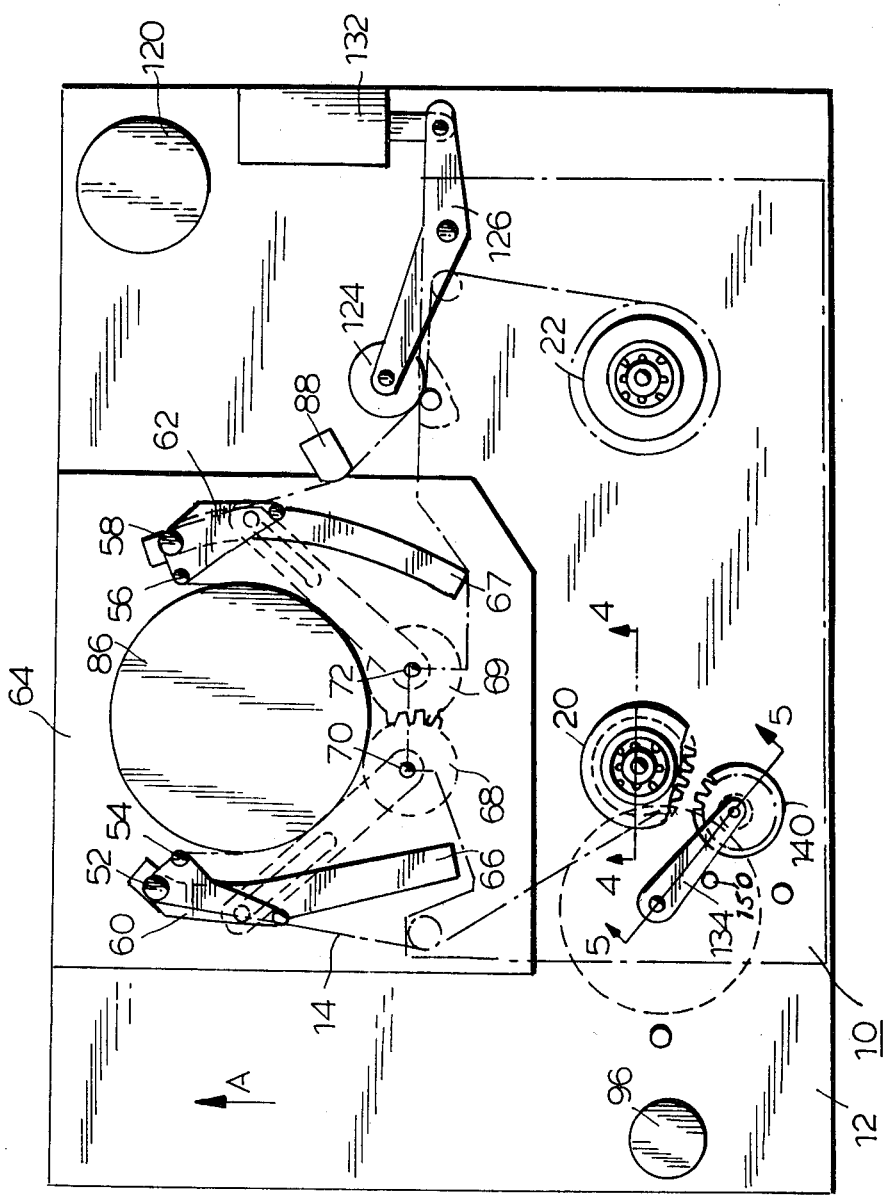

Thus, when gears 68 and 69 are rotated a predetermined degree, the first slider 60 and the second slider 62 reach operative positions as shown in FIG. 2, and the magnetic tape 14 is placed around a guide drum 86 and against an audio magnetic head 88.

Figure 3:
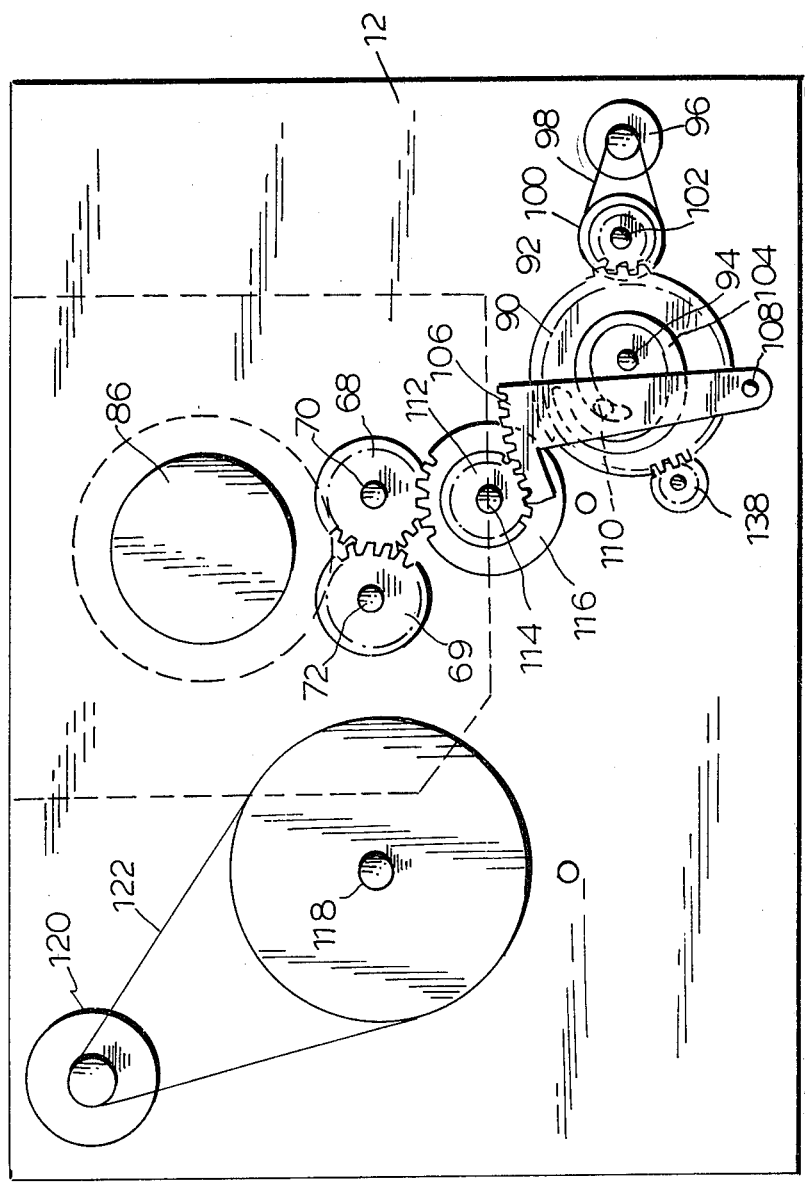
FIG. 3 is a schematic rear plan view of the apparatus of FIG. 1.
Figure 6:
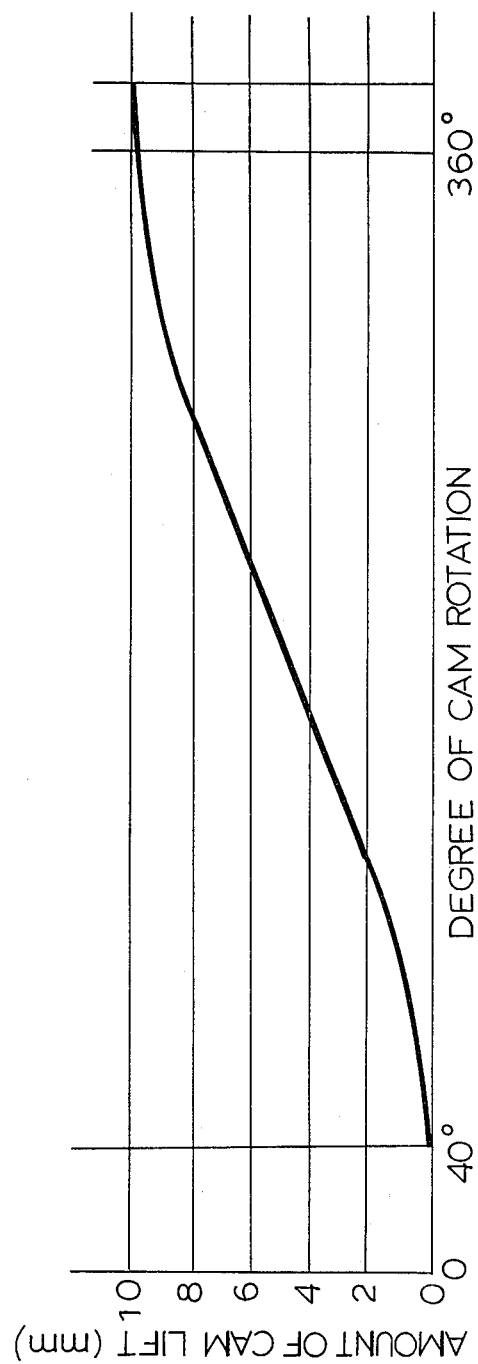
FIG. 6 is a diagram showing the relationship between the amount of cam lift and degree of cam rotation.

As shown in FIG. 3, a cam disk 90, on the periphery of which is formed gear 92, is rotatably mounted on a shaft 94 extending downward from chassis 12, and is driven by a reversible motor 96, which can rotate in both rotational directions, through a belt 98, a pulley 100 and a gear 102. This cam disk 90 has a spiral cam groove 104 extending more than 360 degrees as shown in FIG. 3, but the amount of the cam lift varies only between 40° and 360°, as shown in FIG. 6, which swings a sector gear 106, rotatably mounted on shaft 108 and carrying a cam follower 110 thereon and engaged with the cam groove 104. The sector gear 106 engages a first idler gear 112 rotatably mounted on shaft 114. A second idler gear 116 which rotates together with the first idler gear 112 engages the gear 68 which is described hereinabove.

Consequently, during the counterclockwise rotation of the cam disk 90 from 40° to 360° in FIG. 3, the sector gear 106 is swung counterclockwise around the shaft 108, and the gear 68 rotates counterclockwise and the gear 69 rotates clockwise in FIG. 3, and both sliders 60 and 62 move in the direction of arrow A so as to draw the magnetic tape 14 out of the tape cartridge 10 as shown in FIG. 2. It should be noticed that the cam disk 90 drives both sliders 60 and 62 only between a 40 degree angle and a 360 degree angle.

Then the reversible motor 96 stops, because a switch (not shown) is turned off by the first slider 60 or the second slider 62 when they come to the operative position shown in FIG. 2. The pins 52–58, sliders 60 and 62, gears 68 and 69, cam disk 90, arm 106 and gears 112 and 116 constitute tape loading means.

A capstan 118 is rotatably mounted on the chassis 12 and driven by a capstan motor 120 through a belt 122 as shown in FIG. 3. A pinch roller 124 is rotatably mounted on a support arm 126 which is pivotably mounted on a shaft 128 fixed on the classis 12. The pinch roller 124 is movable toward and away from the capstan 118 by the swinging motion of the support arm 126 about the shaft 128 which is caused by a plunger 132.

Figure 5:
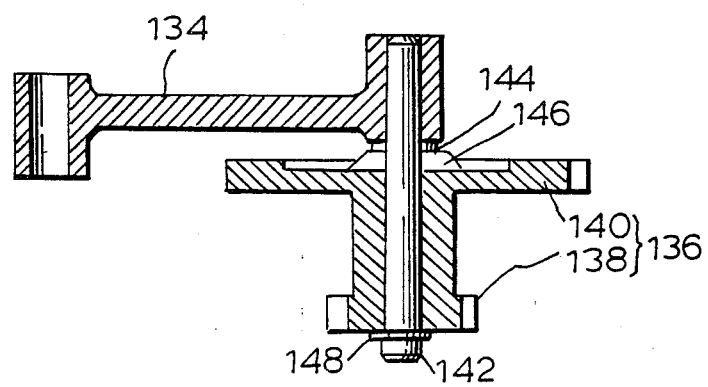
FIG. 5 is a vertical section taken along the line 5—5 of FIG. 2 as viewed in the direction of the arrows and showing part of the turntable drive mechanism.

In a recording and or reproducing operation mode of the apparatus, the magnetic tape 14 is fed by the capstan 118 and the pinch roller 124 and wound on the take-up reel 18 by well-known means (not shown) previously employed in the market. A swing member 134 is pivotably mounted on shaft 94 which also extends above the chassis 12. A planet gear 136, which has a first gear 138 and a second gear 140 thereon as shown in FIG. 5, is rotatably mounted on a shaft 142 fixed on said swing member 134. A friction ring 144 is urged upward by a plate spring 146 which is positioned between said friction ring 144 and the planet gear 136 as shown in FIG. 5. A retaining washer 148 is fastened at the lower end of the shaft 142 so as to restrict the donwward axial movement of the planet gear 136. Therefore, as the planet gear 136 is rotated, the planet gear 136 is slightly braked and swings the swing member 134 around the shaft 94. The cam disk 90, the swing member 134 and the planet gear 136 compose a planetary gear means. The cam disk 90 is the sun gear of this planetary gear means. This planetary gear means acts as clutch means as follows. The swing member 134 is swung in both directions about the shaft 94 in accordance with rotational direction of the cam disk 90. The first gear 138 extends below the the chassis 12 through an opening (not shown) and engages with the gear 92 as shown in FIG. 3. The second gear 140 engages with the gear 38 when the swing member 134 is swung counterclockwise about the shaft 94 in accordance with counterclockwise rotation of the cam disk 90 in FIG. 1 and rotates the supply reel drive turntable 20 counterclockwise. The sun gear 92, swing member 134 and gears 138 and 140 constitute clutch means connected between the reversible motor 96 and slip gear 38, and the clutch means and the slip gear 38 constitute tape drawing-in means.

When the cam disk 90 rotates clockwise in FIG. 2, the swing member 134 is swung clockwise in FIG. 2 until it touches a stop 150, and in this operation mode the second gear 140 is at a first position does not engage with the slip gear 38.

Consequently, clockwise rotation of the cam disk 90 in FIG. 1 makes the second gear 140 disengage with the slip gear 38, and counterclockwise rotation of the cam disk 90 in FIG. 1 makes the second gear 140 engage with the slip gear 38 and rotates the supply reel drive turntable 20 in the tape take-up direction so as to wind up the magnetic tape 14 which is drawn out of the tape cartridge 10 onto the supply reel 16.

Tape loading will now be described. As the operator pushes the recording and/or reproducing button (not shown) of the apparatus when it is in the inoperative mode as shown in FIG. 1, the reversible motor 96 begins to rotate in the clockwise direction, and the capstan motor 120 begins to rotate in the counterclockwise direction in FIG. 3. The cam disk 90 begins to be driven in the counterclockwise direction in FIG. 3 by the reversible motor 96 through the belt 98, the pulley 100 and the gear 102, although the sector gear 106 does not begin to move because of the presence of the flat portion of the cam groove 104 as shown in FIG. 6. As the cam disk rotates beyond the 40 degree point, the cam groove 104 pushes the cam follower 110 left so as to swing the sector gear 106 about the shaft 108 counterclockwise in FIG. 3. Then the gear 68 and the arm 76 begin to rotate clockwise in FIG. 1 so as to move the first slider 60 having the guide pins 52, 54 by means of engagement of the slot 74 and the pin 78 in the direction of arrow A.

Similarly, the gear 69 and the arm 82 begin to rotate counterclockwise in FIG. 1 so as to move the second slider 62 having the guide pins 56, 58 by means of engagement of the slot 80 with the pin 84 in the direction of arrow A. By this drive means, these guide pins 52, 54, 56 and 58 draw the magnetic tape 14 out of the tape cartridge 10 as described hereinabove.

As the cam disk 90 rotates beyond the 360 degree point, the first slider 60 and the second slider 62 come to the operative positions as shown in FIG. 2. At this time, tape loading mode is over and the magnetic tape 14 is wrapped around the guide drum 86 and against the audio magnetic head 88 as shown in FIG. 2, and the reversible motor 96 is stopped by a switch (not shown). It is apparent that the operative positions of both sliders 60, 62 are not influenced by amount of residual rotation of the reversible motor 96 due to the other flat portion of the cam groove 104.

During said tape loading mode, the swing member 134 swings clockwise in FIG. 1 until it touches the stop 150 in accordance with clockwise rotation of the cam disk 90 in FIG. 1, by means of engagement of the gear 92 with planet gear 136, so as to disengage the second gear 140 from the slip gear 38.

After the tape loading operation, the plunger 132 pulls the support arm 126 to push the pinch roller 124 so as to press the magnetic tape 14 against the capstan 118. The magnetic tape 14, which is fed at a constant speed by means of cooperation of the pinch roller 124 and the capstan 118, is wound onto the take-up reel by a well-known reel drive turntable rotating means (not shown).

The recording/reproducing of signals on/from the magnetic tape 14 occurs while the magnetic tape 14 is traveling along the specified tape path as shown FIG. 2.

Tape unloading and tape drawing-in will now be described. The operator pushes the stop button (not shown) of the apparatus while it is in the operative mode as shown in FIG. 2, power is cut off from the capstan motor 120 and the plunger 132 and also the take-up reel drive turntable 22 is stopped.

At the same time, the reversible motor 96 begins to rotate in the opposite or counterclockwise direction in FIG. 3, and the tape loading means returns to the inoperative position, i.e. guide pins 52, 54, 56 and 58 return to their inoperative position as shown in FIG. 1 by an operation the reverse of that described hereinabove so as to carry out tape unloading.

Moreover, as the cam disk 90 rotates counterclockwise in FIG. 1, the swing member 134 turns in the same direction about the shaft 94 until the second gear 140 engages the slip gear 38 which is rotated counterclockwise in FIG. 1.

Consequently, the supply reel drive turntable 20 is rotated counterclockwise in FIG. 1 so that the magnetic tape 14 which has been drawn out of the tape cartridge 10 is drawn back in and wound on the supply reel 16.

It should be noticed that the length of the magnetic tape which can be wound upon the supply reel 16 by the unloading motion just described above is greater than the length of magnetic tape which has been drawn out of the tape cartridge 10. It also should be noticed that tape winding speed just described above is greater than the tape slackening speed caused by return motion of guide pins 52, 54, 56 and 58.

These relationships are achieved by means of appropriate gear ratios of the gear 92 to the slip gear 38 and of the sector gear 106 to the gear 68, and never change even if the cam disk 90 rotates faster to return guide pins 52, 54, 56 and 58 rapidly.

Moreover, excessive tension is not exerted on the magnetic tape 14, because, as described above, the rotation of the slip gear 38 is transmitted to supply reel drive turntable 20 through the frictional mechanism.

The apparatus thus makes it possible to return the magnetic tape 14, which has been drawn out of the tape cartridge 10, onto the supply reel 16 safely and reliably while the first and second sliders 60, 62 are moved back to their inoperative position by the reversible motor 96.

It is apparent that various modifications may be made without departing from the spirit of the invention.

The above described specific example is intended merely to illustrate the various facets in one embodiment of the invention, the scope of which is limited only by the following claims.

What is claimed is:

1. A magnetic tape recording and/or reproducing apparatus for recording and/or reproducing signals on a magnetic tape wound on reels contained in a tape cartridge, said apparatus comprising:
    a reversible motor;
    a pair of drive turntables engagable with the reels in the tape cartridge when the cartridge is inserted in said apparatus for rotating said reels;
    tape loading means connected to said reversible motor for, when said reversible motor is rotated in one direction of rotation, being moved from an inoperative position to an operative position for drawing the magnetic tape out of the tape cartridge and loading the magnetic tape in a specific tape path in said apparatus, and, when said reversible motor is rotated in the other direction of rotation, being moved from the operative position to the inoperative position; and
    tape drawing-in means connected to and driven by said reversible motor when said reversible motor is rotated in said other direction and frictionally engaged with one of said reel drive turntables for driving said one reel drive turntable for drawing the magnetic tape back into the tape cartridge when said tape loading means is moved to the inoperative position.

2. An apparatus as claimed in claim 1 in which said tape drawing-in means comprises:
    a slip gear rotatably mounted for rotation coaxially with said one of said reel drive turntables and frictionally engaged therewith; and
    clutch means connected between said reversible motor and said slip gear and engaging said reversible motor and said slip gear in response to rotation of said reversible motor in said other direction.

3. An apparatus as claimed in claim 2 in which said clutch means comprises:
- a sun gear connected to said reversible motor and driven in both rotational directions by said reversible motor;
- a swing member mounted coaxially with said sun gear;
- a first gear rotatably mounted on said swing member and engaged with said sun gear, said swing member being free to pivotally move around the axis of said sun gear toward and away from a first position;
- a second gear connected coaxially to said first gear, said slip gear being in the path of movement of said second gear with said swing member is moving away from said first position for being engaged by said second gear for rotating said slip gear, said sun gear being driven by said reversible motor when it is rotating in said other direction for moving said swing member away from said first position.

4. An apparatus as claimed in claim 3 in which said tape loading means comprises:
- guide pins for drawing the magnetic tape out of the tape cartridge;
- a cam on said sun gear; and
- drive means driven by said cam for moving said guide pins, said sun gear being driven by said reversible motor when it is moving in said one direction to move said cam and operate said drive means for moving said said pins from their inoperative position to their operative position, and said sun gear being driven by said reversible motor when it is moving in said other direction to move said cam and operate said drive means for moving said pins back from their operative position to their inoperative position.

* * * * *